Aug. 11, 1959　　　　　A. SIMON　　　　　2,898,868
STATION PRESELECTOR FOR TRAVELING CONVEYOR

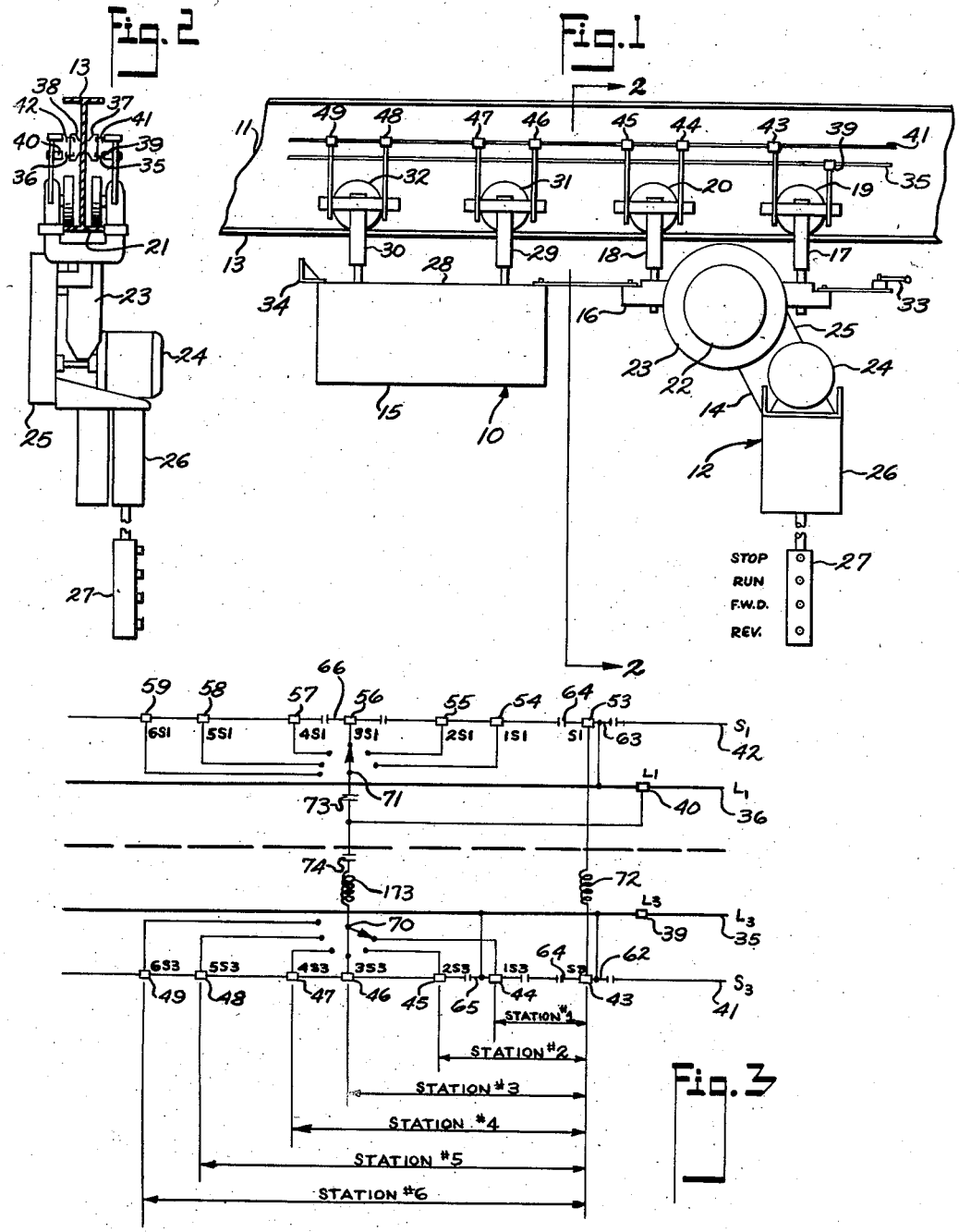

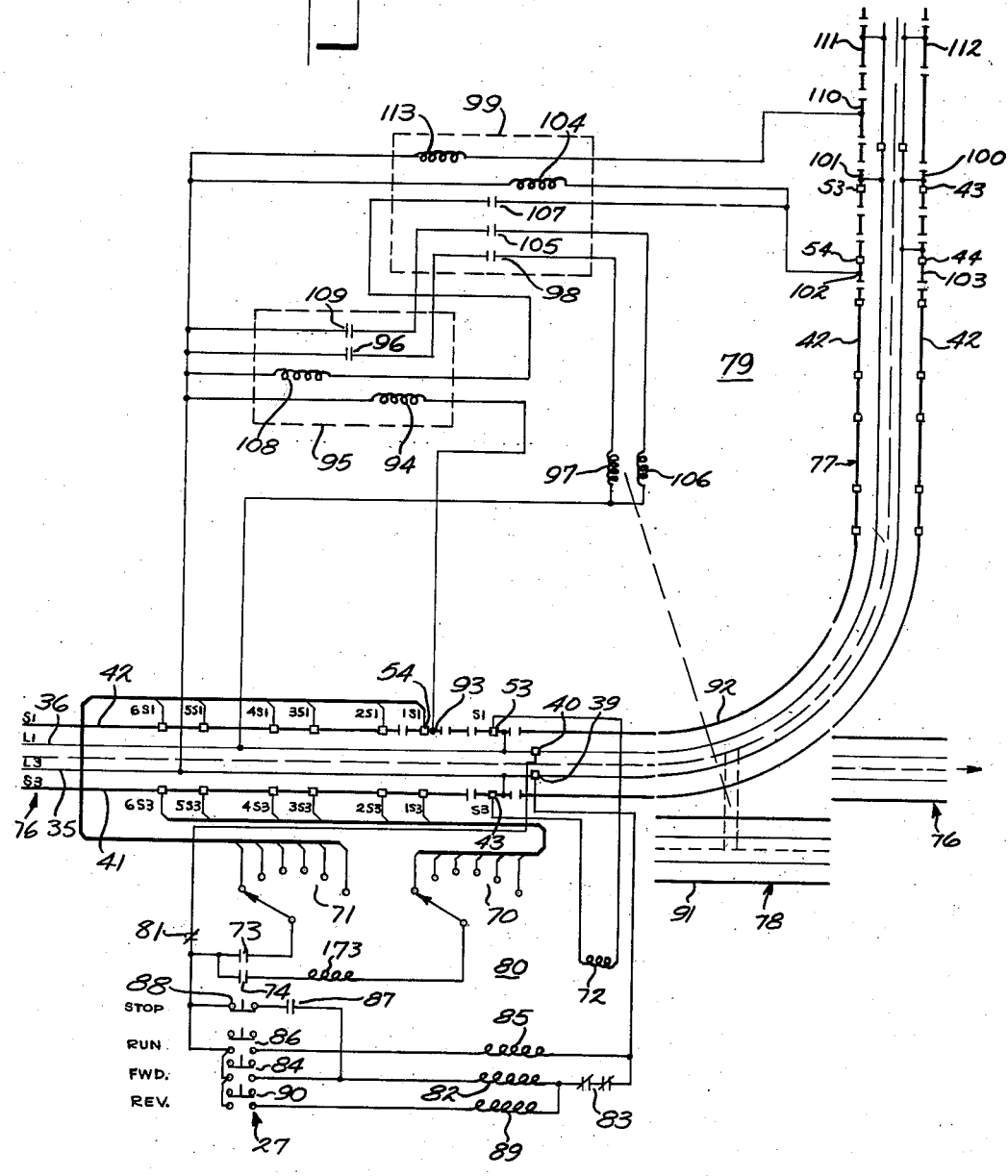

Filed July 23, 1953　　　　　　　　　　3 Sheets-Sheet 3

INVENTOR.
ANDREW SIMON

BY
RICHEY, WATTS, EDGERTON & McNENNY

ATTORNEYS

United States Patent Office 2,898,868
Patented Aug. 11, 1959

2,898,868

STATION PRESELECTOR FOR TRAVELING CONVEYOR

Andrew Simon, Cleveland, Ohio, assignor to The American Monorail Company, Cleveland, Ohio, a corporation of Ohio Application July 23, 1953, Serial No. 369,925

3 Claims. (Cl. 104—88)

This invention relates to article and material handling apparatus and, more particularly, to a conveyor system which is adapted to carry or distribute such articles or materials from a given station to a predetermined one of a number of stations.

An object of the invention is to provide a conveyor system in which a traveling conveyor unit can be sent from one station to any predetermined one of a number of stations.

An object of the invention is to provide a traveling conveyor system in which the traveling conveyor unit may be adjusted to travel from a starting station to any predetermined destination and which will actuate any switches or other apparatus necessary to reach the destination.

Another object of the invention is to provide a traveling conveyor system in which the traveling conveyor unit will operate any necessary switches or track apparatus to direct the traveling unit to a desired destination and to stop the traveling unit after it arrives at that destination.

A further object of the invention is to provide a station preselector system for traveling conveyors which is relatively simple and yet incorporates provision for predetermination of any desired number of operations.

A still further object of the invention is to provide a station preselector system for traveling conveyors which is simple and relatively fool-proof and may be incorporated as a part of existing conveyor systems.

More generally, it is an object of the invention to provide a preselector system for a traveling unit wherein operation of fixed apparatus or operation on the traveling unit may be accomplished at predetermined locations.

In the practical application of traveling conveyor systems, such as the known types of overhead monorail systems, it is often desirable to be able to send a traveling unit from a central location to any one of a number of work stations and to do so without the intervention of human operators. It is desirable that the mode of operation be one in which the desired station information is preset into the traveling unit and which will provide fully automatic operation of the traveling unit after the necessary adjustment has been made.

According to my present invention, I accomplish the above-referenced result in accordance with the objects and purposes of the invention by means of an electrical preselector system which functions to control the movement of the traveling unit in accordance with adjustments made on the traveling unit at a starting station. The adjustments so made suitably modify electrical circuits carried by the traveling unit so that the necessary track switches are operated to direct the traveling unit to a station corresponding to the adjustments made on the traveling unit and to stop the traveling unit when that station is reached.

According to a preferred mode of practice, the necessary control functions are performed by correlating the spacing between two conducting members which are positioned along the track at each station with the spacing of a succession of collectors on the traveling unit. The spacing between the two conducting members along the track is fixed for each station or for each function to be performed and differs from the spacing between the corresponding members at other stations. The collectors on the traveling unit include a first collector and a number of succeeding collectors which are termed "selector collectors," each being spaced from the first collector a distance corresponding to the spacing between the conducting members at one of the stations. The circuits on the traveling unit are connected to the first collector and to any of the selector collectors by means of a selector switch. Accordingly, electrical circuits which are connected to the conducting members will be interconnected with the control circuits on the traveling unit when and only when the selector switch is set to the selector collector whose spacing from the first collector corresponds to the spacing between the two conducting members at that station.

The circuits of the invention provide external circuit control, e.g. for controlling track switches from the traveling unit, as well as internal circuit control, e.g. for stopping the traveling unit at the station of destination.

Other objects, features and advantages of the invention will be more readily apparent from a consideration of the following detailed specification and claims taken in connection with the accompanying drawings, in which:

Fig. 1 is a side view showing the traveling unit and a portion of the track of the conveyor system of the invention;

Fig. 2 is an end view taken in the direction 2—2 in Fig. 1;

Fig. 3 is a schematic representation illustrating the principle of operation of the novel preselector system of the invention;

Fig. 4 is a schematic representation of the circuit diagram of the traveling unit shown in conjunction with a portion of the track system and including a track switch and a station.

Figure 5:
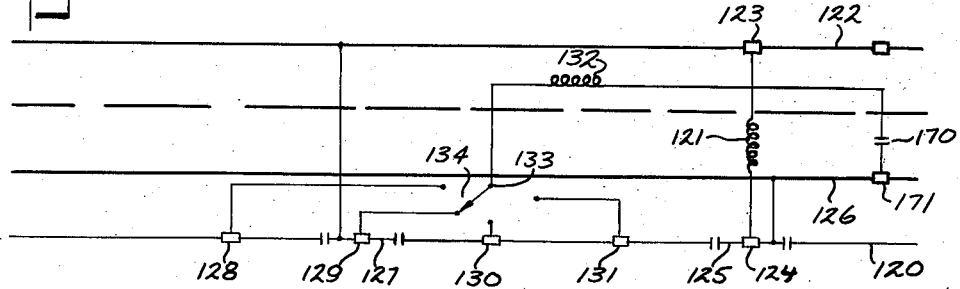
Figs. 5 and 6 are schematic representations of alternative embodiments of the invention.

Referring now to Fig. 1, the traveling conveyor system 10 includes an overhead stationary track 11 and a traveling unit 12. The traveling conveyor system is adapted for installation and use in mills or factories or other places wherein it is required that articles or materials be transported by the conveyor to any of a number of locations. The system is particularly useful where, in production operations or the like, it is necessary to transport raw materials or unfinished parts from a central location to any one of a number of locations for further processing.

The overhead track system includes a monorail 13 which is suitably supported or suspended above the floor and extends continuously between the stations or locations which are to be served by the system. The monorail 13 serves as a support and guide for the traveling unit 12 and is arranged in a manner well known in the art.

The traveling unit or traveler 12 comprises a tractor 14 and one or more trailers, such as the trailer 15. The tractor comprises a main frame 16 which includes two trolley yokes 17 and 18. The yokes 17 and 18 hold two pairs of trolley wheels 19 and 20 which support the tractor 14 from the upper side of the lower flange 21 of the monorail 13. The tractor is driven along the track by a drive wheel 22 which has a rubber tire 23 in tractive engagement with the under side of the flange 21 of the monorail 13. The drive wheel 22 is turned by a drive motor 24 and a suitable power transmission 25. Suitable electrical controls for the drive motor are incorporated in a cabinet 26, while means for performing the necessary manual control operations are provided by a manual control 27.

The trailer 15 similarly comprises a frame 28, two trolley yokes 29 and 30 and two pairs of trolley wheels 31 and 32 for suspending the trailer from the rail 13. The trailer 15 is, of course, suitably designed to carry the loads peculiar to the particular application of the conveyor system. Any suitable number of trailers within the power capabilities of the tractor 14 may be hitched behind the trailer 15. A limit switch 33 on the tractor is connected in the control circuit for the drive motor 24 and is adapted to engage a bumper 34, provided on each of the trailers, so that, if the traveling unit runs into another similar unit, the drive motor will be de-energized to stop the unit.

The tractor 14 is powered by electrical energy which is continuously supplied to the drive motor 24 by electrical conductors disposed along the monorail 13. Two power bars 35 and 36 are supported on opposite sides of the monorail 13 by suitable insulators 37 and 38 and are connected to a suitable electrical generator at some point along the system. The power bars 35 and 36 are engaged by two power collectors 39 and 40 which are mounted upon the tractor 14 and receive the electrical energy from the power bars. The power collectors 39 and 40 are suitably connected to the drive motor 24 through the control circuits as will be explained hereinafter.

The traveling unit or traveler 12 incorporates suitable electrical circuits which may be adjusted at one station in a manner such that when started by an operator, the unit will travel to a selected destination and stop, having automatically operated such track switches as may be necessary to reach that destination. To that end, the conveyor system incorporates a pair of selector bars 41 and 42 which are mounted at either side of the rail 13 upon the insulators 37 and 38.

The selector bars 41 and 42 are engaged by two sets of collectors which are mounted upon the traveling unit 12 and function to transmit and receive control currents to and from the selector bars. One set of collectors 43, 44, 45, 46, 47, 48 and 49 appears in the side view of Fig. 1, while the remaining set of collectors 53, 54, 55, 56, 57, 58 and 59 is shown in the representation of Fig. 3. The individual collectors of the two sets are disposed on opposite sides of the monorail 13, although such an arrangement is not essential to the practice of the invention.

The various collectors are supported by the trolley yokes of the traveling unit and are suitably connected by cables to the control circuits in the cabinet 26 of the tractor 14.

In the arrangement shown, the trailers which are pulled by the tractor 14 carry their own selector collectors for reasons which will appear hereinafter. Such an arrangement is, of course, not necessary to the practice of the invention; and, under certain circumstances, it may be desirable to mount all the collectors on the tractor.

Referring now to Fig. 3, the representation of the preselector system of the invention includes a schematic showing of the power bars 35 and 36, designated as L1 and L3, respectively, and the selector bars 41 and 42, designated as S1 and S3, respectively. The monorail is designated by a dotted line and constitutes a ground return. The power collectors 39 and 40 are shown in a position corresponding to that in the actual traveling unit.

Of the two sets of collectors 43–49, inclusive, and 53–59, inclusive, the position of the two lead collectors 43 and 53 serves as a reference for the remainder of the two sets of collectors. Collectors 43 and 53 will, therefore, be hereafter designated as first, lead or impulse collectors, while the remaining collectors 44, 45, 46, 47, 48 and 49 and 54, 55, 56, 57, 58 and 59 will be designated as second or selector collectors.

Each pair of selector collectors is spaced a fixed distance from the impulse collectors, and each successive pair of selector collectors is a greater distance from the impuse collectors than the preceding pair of selector collectors. Each of these distances corresponds to an arrangement of the selector bars at one of the stations or locations at which the control circuits are to be operated, and each of the selector collectors is, therefore, designated by a pair of numbers. The first number designates the station at which the selector collector is to become operative, while the second number indicates the selector bar and, therefore, as will be explained, the control which is operated by that collector. Thus, selector collector 56 is designated as collector 3S1 to indicate that the collector is the third in succession from the impulse collector, or, alternatively, is spaced a predetermined third distance from the impulse collector and controls a circuit associated with selector bar S1.

Each bar includes an insulated section which serves as a position determining or reference section associated with the impulse collectors 43 and 53. These sections, designated at 62 and 63, comprise conducting pieces which are insulated from the remainder of the selector bar by suitable insulating members 64, represented by blank spaces and vertical lines in the diagram. It is necessary that the insulators 64 be longer than the collectors so that, during travel, a collector does not simultaneously engage one of the insulated sections and the adjacent portion of the collector bar.

There is associated with each of the impulse sections 62 and 63 a selector section which is spaced a predetermined distance from the impulse section and corresponds to one of the distances between an impulse collector and an associated selector collector. Thus, an insulated section 65 in selector bar 41 is spaced at such a distance from the section 62 that it is engaged by the selector collector 44 at the same time that the impulse section 62 is engaged by the impulse collector 43.

Similarly, an insulated section 66 in selector bar 42 is spaced at such a distance from the section 63 that it is engaged by the selector collector 56 at the same time that the impulse section 63 is engaged by the impulse collector 53. Each station or location at which the control circuits of the tractor 14 are to be actuated to modify the movement of the traveling unit 12 or are to act upon some part of the system external to the traveling unit, such as track switches, has an associated pair of selector bar sections which are spaced apart a distance which is unique for that location or unique for the function to be performed so that the corresponding selector collectors are operative only for those stations. Thus in the representation of Fig. 3, the selector collector 44 is operative only at station 1, while the selector collector 56 is operative only at station 3.

Since each of the selector collectors successively engages the selector bar sections, it is necessary that means be provided whereby only the selector collector which is spaced the desired distance corresponding to a given station from the impulse collector be operatively connected to the control circuits. The function is accomplished by the provision of a selector switch 70 having the fixed contacts thereof connected to the selector collectors 44, 45, 46, 47, 48 and 49 and a second similar selector switch 71 having the fixed contacts thereof connected to the selector collectors 54, 55, 56, 57, 58 and 59, respectively. A relay 72 has the solenoid thereof connected to the impulse collectors 43 and 53, while two sets of normally open contacts 73 and 74 of the relay are connected in series with the variable contacts of the selector switches 70 and 71. The impulse sections 62 and 63 are connected to the power bars 35 and 36 so that the relay 72 is energized to close the contacts 73 and 74 when the impulse collectors 43 and 53 are engaged with the impulse sections 62 and 63. It will be apparent, therefore, that the associated circuits will be energized through the contacts 73 and 74 when and only when the selector collector to which the selector switch is set contacts the associated selector section at the same time that the impulse collectors contact the impulse sections. Any one of any arbitrary number of stations or locations may thus be preselected by adjustment of the selector switches, and the possible range of selection is limited only by the number of selector collectors available on the traveling unit.

The selector collectors 44–49, inclusive, and the selector switch 70 comprise a part of a first preselector system which is utilized as an internal circuit control, e.g. to stop the drive motor 24. The drive motor is started manually at the home station and the internal circuit control functions to stop the drive motor at the particular station preselected by adjustment of the selector switch 70.

The selector collectors 54–59, inclusive, and the selector switch 71 comprise a part of a second preselector system which is utilized as an external circuit control. The external circuit functions to energize and deenergize suitable relays for actuating any track switches necessary for the traveling unit to reach the destination selected by the selector switch 70 as determined by corresponding adjustment of the selector switch 71.

Referring now to Fig. 4, there is shown a schematic representation of a portion of a conveyor system embodying the principles of the invention. There is shown a main track 76, a side track 77, a track switch 78, an external control circuit 79 for operating the track switch 78 and the circuits 80 of the traveling unit 12. The selector switches 70 and 71 and selector relay 72 are connected to the various collectors in the same fashion as in Fig. 3.

The power collector 40 of the traveling unit is connected through a set of normally closed contacts 81 of the bumper limit switch 33 to the contacts 73 and 74 of the selector relay 72 and to the contacts of the manual control 27.

The forward drive motor starter 82 is connected through overload relay contacts 83 to the power collector 39 and to the normally open contacts of a forward drive switch 84 of the manual control 27. Automatic forward operation is provided by a power relay which has a latch coil 85 thereof connected to the power collector 39 and to the normally open contacts of the run switch 86 of the manual control 27. A pair of normally open latch relay contacts 87 associated with the coil 85 are connected to the forward starter through a set of normally closed contacts 88 of the stop switch of the manual control 27.

A reverse coil 89 of the motor starter is connected to the normally open contacts 90 of the reverse switch of the manual control 27. It will be seen that the traveling unit may be controlled by the manual control 27 and may be caused to move continuously by actuating the run switch 86. During continuous operation, the unit is stopped by the preselector system which energizes an unlatch coil 173 of the power relay to open the contacts 87 of that relay.

The track switch 78 is normally maintained in such a position that the straight portion 91 provides a continuation of the main track. In Fig. 4, the position of the collectors of the traveling unit is such that the traveling unit has reached a point along the main track that the circuit 79 has been energized to shift the track switch 78 to the position shown, e.g. with a curved portion 92 connecting the main track 76 with the side track 77. In this position, the relay 72 has been energized by the impulse sections 62 and 63 and the contacts 73 closed to connect the power bar 36 through position 1S1 of selector switch 71 to collector 54, a selector section 93 and through an unlatch coil 94 of a first track relay 95 and back to the power bar 35 to form a complete circuit.

The unlatch coil 94 closes the contacts 96 of the relay 95 to energize a coil 97 of a track relay which, in turn, actuates the necessary apparatus to cause the track switch 78 to move to the side track position shown. The contacts 98 of a second latch relay 99 are connected in series with the contacts 96 and the coil 97 and are in a closed position at this time for reasons which will be explained hereinafter. The movement of the track switch to the side track position is completed in time for the traveling unit to enter the curved section 92 of the track switch and continue into the side track 77.

If the track switch 78 were left in the side track position, a second traveling unit following the first would be shunted into the side track 77 whatever the setting of the selector switches of that unit. Accordingly, provision is made whereby, after the first traveling unit has passed over the track switch 78 and into the side track 77, the track switch control circuit 79 is caused to return the track switch 78 to normal or straight-through position.

As the traveling unit moves along the side track 77 toward the station of destination, it reaches a position indicated by the impulse collectors 43 and 53 and selector collectors 44 and 54 where the selector bars 41 and 42 are provided with the necessary impulse and selector sections to operate the track switch circuit 79 and to stop the unit.

Two impulse sections 100 and 101 are associated with a first selector section 102 in the external circuit control selector bar 42 and a selector section 103 in the internal circuit selector bar 41. As the traveling unit reaches the position where the impulse collectors 43 and 53 are energized from the impulse sections 100 and 101, the external selector section 102 is energized in the same manner as the selector section 93 of the main track is energized, since the two sections are spaced the same distances from their corresponding impulse sections. The latch coil 104 of the second latch relay 99 is, therefore, energized to open contacts 98 and close contacts 105. The contacts 105 are connected in series with a solenoid coil 106 of a track relay and cause the track switch 78 to be moved back into the straight-through position. A third set of contacts 107 of the latch relay 99 are also closed to energize the latch coil 108 of latch relay 95 and thereby open contacts 96 and close contacts 109. Upon closure of contacts 109, the coil 106 is energized and the track switch 78 moves back into the straight-through position.

As shown in Fig. 4, track switch 78 is returned to its normal straight-through position at the same time that the traveling unit is stopped. To this end, the internal selector section 103 is connected to the power bar 35, and the selector collector 44 is energized upon engagement with that section. Inasmuch as the contacts 74 are closed by reason of the actuation of the selector relay 72 and the selector switch 70 is adjusted to form a circuit through the selector collector 44, the unlatch coil 173 of the latch relay is energized, and the contacts 87 are opened to stop the traveling unit. The unit may then be unloaded or loaded at the station or destination. The traveling unit will remain at that location until the manual control 27 is actuated by an operator.

When the track switch 78 was returned to its normal straight-through position, the control circuit 79 was left in such a condition that a second conveyor unit traveling along the main track 76 could not possibly actuate the track switch 78 and enter the side track 77. Otherwise, if the selector switch of a second traveling unit corresponding to the selector switch 71 were adjusted to the position 1S1, the unit would enter the side track 77 and collide with the first unit. Accordingly, the track switch 78 may be actuated by a second traveling unit only after a first traveling unit has left the side track 77.

To this end, there is positioned beyond the stopping point an external selector section 110 spaced from a pair of impulse sections 111 and 112 at a distance corresponding to the adjustment of the selector switch 71, e.g. the same as that of sections 93 and 102. As the traveling unit moves from the station of destination to return to the station of origin, the section 110 is energized and an unlatch coil 113 of the second latch relay 99 is energized. Upon energization of the unlatch coil 113, the contacts 105 and 107 of relay 99 are opened, while contacts 98 of that relay are closed. The control circuit 79 is, therefore, left in a condition whereby the contacts 96 may be closed by energization of the unlatch coil relay 94 to energize the coil 97 of the track relay. As has been previously explained, such energization will shift the track switch 78 to the side track position and will take place only when the external control selector of the traveling unit is properly adjusted to energize the external selector section 93.

A number of side tracks similar to the side track 77 may be associated in succession with the main track 76. Each of the side tracks returns to the main track at an appropriate point so that the traveling units may be returned to the station of origin. The actual arrangement of the track and associated control circuits is not intended to necessarily form a part of the present invention, but is more generally an illustrative embodiment of the invention which sets forth the manner in which the preselection principle of the invention may be utilized to control apparatus on the traveling unit and also station apparatus disposed along the path of travel of the unit.

Referring now to Fig. 5, there is shown an alternative embodiment of the invention in which the internal circuit control function is accomplished by the use of a single selector bar 120. The selector relay 121 is continuously connected to a first power bar 122 by a collector 123 but is energized only when an impulse collector 124 engages an impulse section 125 which is connected to the second power bar 126. A selector section 127 is connected to the first power bar 122 and is adapted to be engaged by one of the collectors 128, 129, 130 or 131 in the same fashion as described in connection with the previous embodiment of the invention. A solenoid coil 132 is connected to the variable contact 133 of a selector switch 134 and to the collector 171 and the second power bar 126 through a normally open contact 170 of the impulse relay 121. The solenoid coil 132 is thus energized from the two power bars when the impulse collector and an appropriate selector collector simultaneously engage the impulse section and the selector section of the single selector bar. The selector section is preferably connected to the power bar 122 and the coil 132 to the power bar 126 through a collector 171 to insure against false operation of the impulse relay 121.

Figure 6:
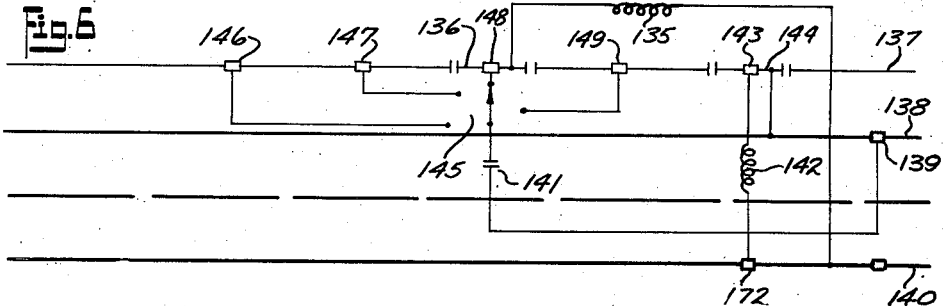

The alternative embodiment of Fig. 6 is similar to that of Fig. 5, but is adapted to perform the external circuit control function. The solenoid coil 135 of the external circuit is connected to a selector section 136 of the single selector bar 137 and to a power bar 140. The external circuit is also energized from a collector 139 which is in continuous engagement with a power bar 138 and through a pair of normally open contacts 141 of a selector relay 142. The selector relay 142 is actuated by contact between an impulse collector 143 and an impulse section 144 which is connected to the first power bar 138 and through a collector 172 which engages the second power bar 140. A selector switch 145 is connected to the selector collectors 146, 147, 148 and 149 and completes the circuit for the coil 135 when properly adjusted to correspond to the position of the selector section 136.

It is to be understood that while the preselector systems are illustratively embodied with respect to the operation of a track switch and a drive motor of the traveling unit that the invention is by no means limited to such use. Thus, the external circuit control as embodied in Figs. 1–4, inclusive, and Fig. 6 may be utilized to operate delivery chutes and the like for loading the trailers at predetermined locations. Similarly, the internal circuit control as embodied in Figs. 1–4, inclusive, and Fig. 5 may be utilized to actuate a release mechanism to unload the trailers at predetermined locations.

It will be understood that the only limitation imposed upon the number of stations between which preselection may be made is that imposed by the number of selector collectors in a traveling unit. Accordingly, it is intended that, in the practice of the invention, any suitable number of sets of collectors may be utilized; and that a flexible arrangement, such as that shown in Fig. 1, may be readily employed. The additional selector collectors are thereby provided as the necessity for their use arises. It is, of course, possible to add more collector bars to provide control of additional operations. It is an important feature of the invention that each class of operations is controlled by a preselector which functions independently and without affecting other classes of operations.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A traveling conveyor system comprising a track, a traveler movable along said track and including a propelling motor, a source of power, at least two power lines along said track and connected to said source, a selector bar along the track and including first and second insulated sections at each of a plurality of stations, said sections being spaced apart different predetermined distances at each of the different stations, the first of said sections being connected directly to one of said power lines, the second of said sections being connected to the other power line, a first collector on the traveler engageable with said first section, a plurality of second collectors on the traveler spaced apart at distances conforming to said predetermined distances and engageable with said second section at each of the stations, and means on the traveler for controlling said motor at said stations, said means including all the following elements; a pulsing relay connected to the first said collector and to the other power line, an unlatch coil constituting the final control element for said motor in said means, said pulsing relay having a contactor with two terminals, one of which is connected to said first one of the power collectors and the other of which is connected to a terminal of the unlatch coil, a selector switch having a movable arm and a plurality of contacts, said arm being connected to the other terminal of said unlatch coil, and means connecting each of said contacts to its respective second collector.

2. A traveling conveyor system comprising a track, a traveler movable along said track and including a propelling motor, a source of power, at least two power lines along said track and connected to said source, a selector bar along the track and including first and second insulated sections at each of a plurality of stations, said sections being spaced apart different predetermined distances at each of the different stations, the first of said sections being connected directly to one of said power lines, the second of said sections being connected to the other power line, a first collector on the traveler engageable with said first section, a plurality of second collectors on the traveler spaced apart at distances conforming to said predetermined distances and engageable with said second section at each of the stations, and means on the traveler for actuating an external device at said stations, said means including all the following elements; a pulsing relay connected to the first said collector and to the other power line, said pulsing relay having a contactor with two terminals, one of which is connected to said first one of the power collectors, a selector switch having a movable arm and a plurality of contacts, said arm being connected to the other terminal of said pulsing relay, means connecting each of said contacts to its respective second collector, and a solenoid coil constituting the final control element for said external device, and means connecting said solenoid coil to said one power line and to its respective second section.

3. A traveling conveyor system comprising a track, a traveler movable along said track and including a propelling motor, a source of power, at least two power lines along said track and connected to said source, two selector bars along the track and including first and second insulated sections at each of a plurality of stations, one of said bars constituting part of an internal circuit and the other bar constituting part of an external circuit, said first and second sections being spaced apart different predetermined distances at each of the different stations, the first section of said internal bar being connected to one power line and the first section of the external bar being connected to the other power line, the second of said sections of the first selector bar being connected to the said one power line, first collectors on the traveler engageable with said first sections, a plurality of second collectors on the traveler spaced apart at distances conforming to said predetermined distances and engageable with said second sections of both bars at each of the stations, means on the traveler for controlling said motor at said stations, said means including all the following elements; a pulsing relay connected to the first said collectors, an unlatch coil constituting the final control element for said motor in said means, said pulsing relay having two contactors each having two terminals, the two terminals of the first contactor being connected to said first one of the power collectors and to one terminal of the unlatch coil, a first selector switch having a movable arm and a plurality of contacts, said arm being connected to the other terminal of said unlatch coil, and means connecting each of said contacts to its respective second collector, and means on the traveler for actuating an external device, said means including all the following elements; the two terminals of the second contactor of said pulsing relay being connected to the said one of the power collectors, a second selector switch having a movable arm and a plurality of contacts, said arm being connected to the other terminal of said second contactor, means connecting each of said contacts to its respective second collector, a solenoid coil constituting the final control element for said external device, and means connecting said coil to said other power line and to its respective second section.

References Cited in the file of this patent

UNITED STATES PATENTS

| | | |
|---|---|---|
| 1,243,457 | Stuart | Oct. 16, 1917 |
| 1,379,614 | Bennington | May 31, 1921 |
| 2,392,417 | Spafford et al. | Jan. 8, 1946 |
| 2,614,506 | Mullerheim | Oct. 21, 1952 |
| 2,688,931 | Spafford | Sept. 14, 1954 |
| 2,688,932 | Heil | Sept. 14, 1954 |
| 2,688,934 | Quail | Sept. 14, 1954 |
| 2,714,355 | Benson | Aug. 2, 1955 |

OTHER REFERENCES

Automatic Materials Handling, The Louden Machinery Company, Fairfield, Iowa, U.S.A., Printed in U.S.A. (5–46), 24 pp.